Sept. 30, 1941.  N. E. WAHLBERG  2,257,628
BRAKE
Filed April 17, 1939  3 Sheets-Sheet 1

INVENTOR.
NILS ERIK WAHLBERG
BY Carl J. Barbee
ATTORNEY.

Sept. 30, 1941.　　　　N. E. WAHLBERG　　　　2,257,628
BRAKE
Filed April 17, 1939　　　　3 Sheets-Sheet 2

INVENTOR.
NILS ERIK WAHLBERG
BY Carl J. Barbee
ATTORNEY.

INVENTOR.
NILS ERIK WAHLBERG
BY Carl J. Barbee
ATTORNEY.

Patented Sept. 30, 1941

2,257,628

UNITED STATES PATENT OFFICE 2,257,628

BRAKE

Nils Erik Wahlberg, Kenosha, Wis., assignor to Nash-Kelvinator Corporation, Kenosha, Wis., a corporation of Maryland Application April 17, 1939, Serial No. 268,258

20 Claims. (Cl. 188—2)

This invention relates to brakes for wheeled vehicles, more particularly for automotive vehicles, and has for its object to provide a controlling mechanism for such brakes which will equalize the stopping effect between the wheels and the ground of the two wheels on one axle.

Devices presently in use for braking on vehicles of the automotive type are almost all hydraulically operated. Hydraulically operated brakes provide a solution to the problem of applying equal force to all brakes to expand the brake shoes into contact with the brake drum, and serve, by proper proportioning of the size of the force-applying cylinder located adjacent each brake, to distribute the braking force to the brake shoes in the most advantageous manner.

Up to this point hydraulically operated brakes have been found extremely satisfactory, but their utility extends no farther than this, as there are various elements which may enter into a determination of the coefficient of friction which exists between the braking surfaces. Various liquids, such as oil, grease or water, may come into contact with either the brake lining or the brake drum, and the presence or absence of such liquids will cause the coefficient of friction between the braking surfaces to vary through a range of 0.2 to 0.5, and the resulting braking effect will vary in the same proportion. Dust and dirt accumulating within the brake will have a similar disturbing effect upon the coefficient of friction. For example, fine particles of sand upon the braking surfaces may roughen such surfaces and might tend to increase the coefficient of friction between them. A further cause for variation of the coefficient of friction between the several brakes exists in the cooling effect due to a cross wind. For example, a wind blowing from one side of a vehicle will cause the brake drums upon the windward side to remain cool and of normal diameter, whereas the brake drums upon the opposite or leeward side of the vehicle, not being subjected to the cooling effect of the wind, will become warm and the dimensions of the brake drum will increase.

It will thus be apparent that varying conditions will prevail in the four brake mechanisms of the vehicle which will not always be similar and which conditions cannot be anticipated by the hydraulically operated types of brakes at present employed in almost all automotive vehicles.

It is an object of the invention to overcome the disadvantages of unequal braking effect which are pointed out above.

It is a further object of the invention to provide means whereby two wheels upon one axle will provide an equal braking effect between the ground and the vehicle wheel by means of hydraulically actuated equalizing mechanism.

An additional object of the invention is to provide a mechanically actuated braking system in which advantage may be taken of an equalizing mechanism employing hydraulically actuated devices, thus retaining the safety of mechanical brakes while providing in addition to the advantages of hydraulic brakes, actual equalization of the drag between pavement and wheel.

A still further object of the invention is to provide a hydraulic equalizing system for mechanical brakes which will be operative to equalize braking effect in either direction of movement of the vehicle.

Further advantages will appear hereinafter as the description proceeds and will be pointed out in connection with the appended claims.

In the drawings, of which there are two sheets, and which are to be taken as illustrative rather than as limiting the invention:

Figure 1:
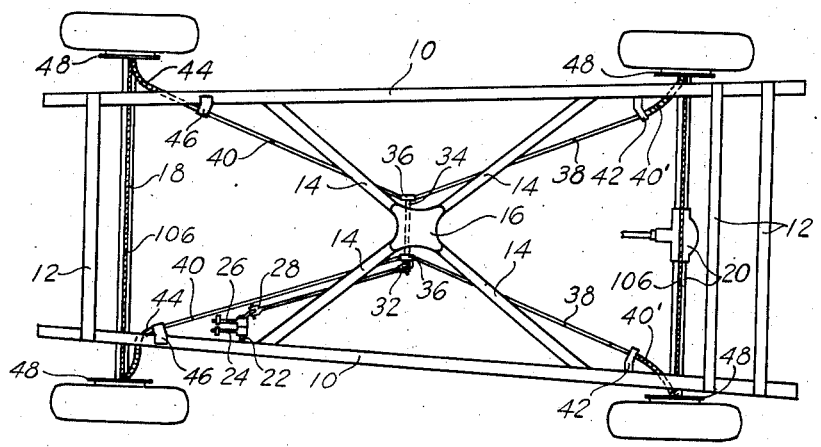
Figure 1 is a plan view of a vehicle chassis showing the device of the present invention applied thereto.
Figure 2:
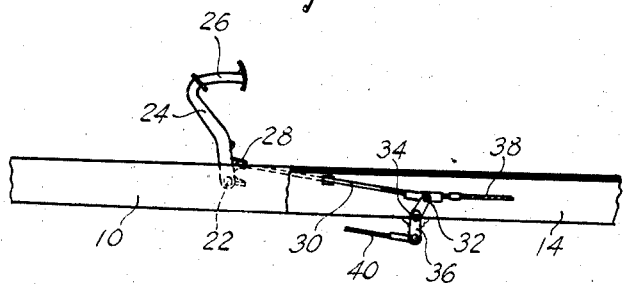
Figure 2 is an elevational view, partially in section, showing a portion of the brake operating mechanism.

Referring more specifically to the drawings in which similar reference characters are employed throughout to designate similar parts, the invention is illustrated as being applied to an automobile. From an inspection of Figure 1 the vehicle will be seen to comprise a frame made up of side members 10, cross members 12 and intermediate diagonally extending strengthening members 14 which are connected by a plate 16 at their point of intersection. The running gear of the vehicle includes a front axle 18 and a rear axle 20 which may be supported from the frame by means of springs (not shown) in the usual manner.

A stub shaft 22 projecting laterally from one of the side frame members 10 provides a bearing upon which are rotatably mounted a clutch pedal 24 and a brake pedal 26, an intermediate portion of the brake pedal 26 being pivotally connected at 28 to a rod 30 which extends rearwardly and has its opposite end pinned to the upper end 32 of an operating lever fast on a rock shaft 34 mounted for rotation upon the diagonal frame members 14. Upon each side of the junction between the diagonal frame members 14, the rock shaft 34 has secured thereto for rotation therewith, a cable operating lever 36.

Cables 38 extending to the rear wheel brake operating mechanism are secured to the upper ends of levers 36 while cables 40 extending to the front wheel brake operating mechanism are secured to the lower ends of the levers 36. Cables 38 enter flexible conduits 40' secured to the frame at 42 adjacent each wheel and to the backing plate 48 to form a flexible cable guide for permitting the wheel to rise and fall in accordance with the inequalities of the road without affecting the brake pedal. A similar construction including flexible conduit 44 and securing elements 46 is employed at the front wheels so as to permit turning movement of the front wheels.

Figure 4:
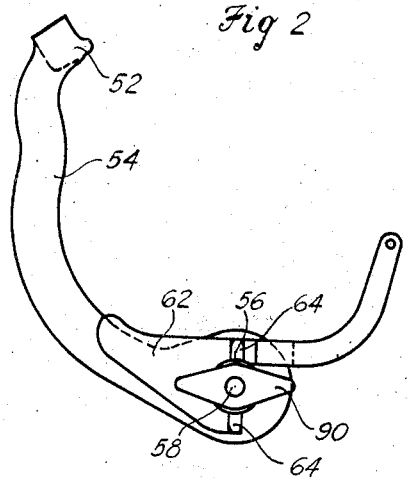
Figure 4 is a detail view of a brake applying lever, spreader cam and associated mechanism.
Figure 3:
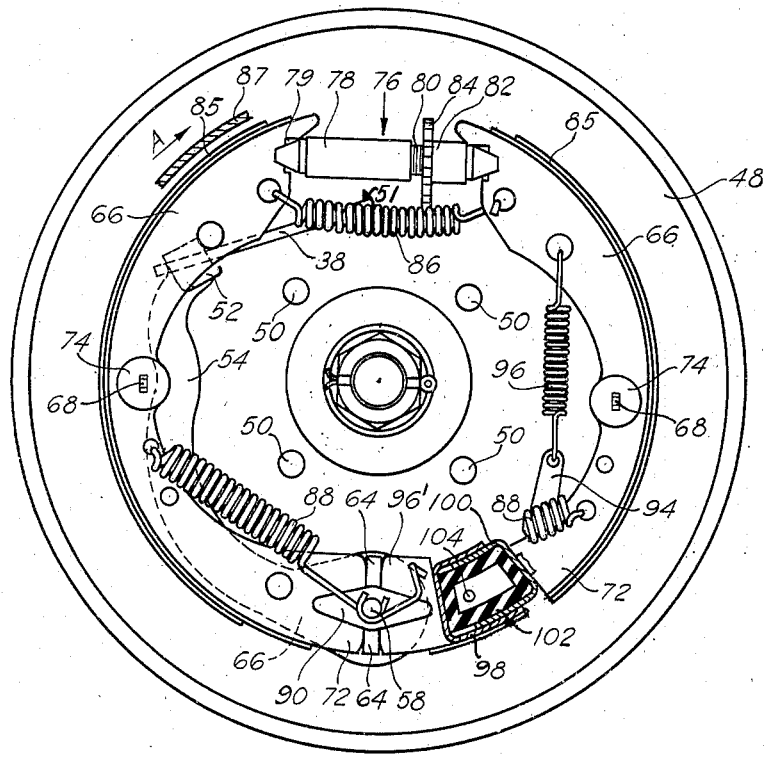
Figure 3 is an elevational view of a right rear brake mechanism, the brake drum and wheel being removed and parts being shown in section in order more clearly to illustrate the invention.

Referring specifically to Figure 3, which illustrates the brake mechanism on the right rear wheel shown in Figure 1, such brake mechanism includes a backing plate 48 which may be secured to the rear axle 20 as by means of bolts which may pass through the apertures 50 therein. The cable 38, which passes through an aperture 51 in the backing plate, is secured by any suitable means to the upper end 52 of a lever 54 pivoted at its lower end upon a sleeve 56 (see Fig. 4) rotatably mounted upon an anchor pin 58 fast to the backing plate 48.

Figure 5:
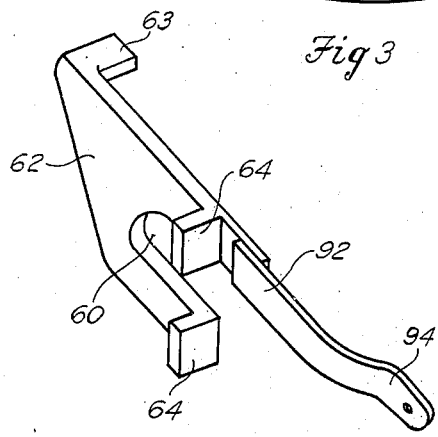
Figure 5 is a detail perspective view of the spreader cam shown in Figure 4.

The anchoring pin 58 is also embraced by a slot 60 (see Fig. 5) in a spreader cam member 62 which has a side extension 63 which normally rests upon the upwardly presented surface of the lever 54. Member 62 is provided with spreader cams 64 which are adapted to spread the shoes 66 of the brake mechanism apart when the lever 54 is rotated in a clockwise direction, as viewed in Figure 3, by engagement of said cams with the ends of the central web 72 of shoes 66.

The brake shoes 66 are floatingly held intermediate their ends upon pins 68 so that they may have a slight amount of movement in all directions with respect to such holding means. This construction is shown more in detail in Figure 7 which illustrates the pin 68 as surrounded by a spring 70 compressed between the brake shoe center web 72 and a washer 74 held in place by means of a head on the end of the pin 68.

The upper ends of the shoes 66 are held spaced apart by a star wheel adjusting mechanism 76, which comprises an internally threaded sleeve 78 having a bifurcated end engaged in a slot 79 in brake shoe 66, a screw 80 threaded into the internally threaded member 78, and an anchor 82 with respect to which a star wheel 84 integral with the screw 80 is rotatable. Rotation of the star wheel tends either to spread apart or move together the upper ends of the brake shoes 66 for adjusting the brakes, to compensate for wear of the linings 85 upon the drums 87. A spring 86, which has its opposite ends anchored in the opposed upper ends of the brake shoe central webs 72, has its intermediate portion in engagement with depressions in said star wheel 84 to prevent movement thereof from its adjusted position. Spring 86 also serves to hold the upper ends of the shoes 66 in their retracted position and seated against the bottom of the slots in adjuster 76.

Additional means for retracting the shoes from brake applying position are illustrated as comprising springs 88 having one end anchored in notches in the anchor pin 58 and the other end secured to the shoes 66. A retaining plate 90 may be secured on and against rotation with the anchor pin 58 for the purpose of retaining the central web 72 of the brake shoes 66 in position against the end of sleeve 56.

The spreader cam mechanism 62 has attached thereto, as by welding, a spring anchor 92 (see Fig. 5) which has an upper end 94 to which one end of a tension spring 96 is secured, the opposite end of the tension spring being hooked in an aperture in the brake shoe 66.

One of the brake shoes 66 is shorter than the other and is provided adjacent its spreader-cam-contacting end with a cam contactor 96' to which a hollow socket 98 is welded. The web 72 of the brake shoe may have secured thereto a cooperating hollow plug 100 which is telescoped into the socket 98. Within the space formed by the telescoping socket 98 and plug 100 there is received a closed rubber bag or blister 102 which has the shape of the space enclosed by members 98 and 102. An outlet 104 is provided from the blister 102 and a flexible conduit 106 extends from said blister outlet 104 and across the axle 20 to a similar blister located in a shoe in the opposite brake applying mechanism upon the left rear wheel.

It will of course be understood that the two front wheel brake applying mechanisms are supplied with a similar construction and are connected by a similar flexible conduit 106 so as to equalize the braking effect between the two front wheels.

It will be recognized that the brakes are applied by rotating the spreader cams 64 in a clockwise direction, as viewed in Figure 3, and that this serves to move the upper cam member 64 to the right and the lower cam member 64 to the left in order to spread the lower ends of the shoes 66 apart. The upper ends of the shoes 66 are held in their adjusted relation by the adjusting mechanism 76, and accordingly the shoes 66 must move outwardly.

In operation and assuming the brakes to be in their normal unapplied condition as shown in Figure 3, the brake pedal 26 is depressed to rotate the levers 36 and exert a forward pull upon the cables 38. Cable 38, being attached to lever 54, rotates the same about the anchor pin 58 and lifts one end of the cam-carrying member 62 through the lug 63 overlying the lever 54. The cam portions 64 of member 62 are located about the anchor pin 54, the upper cam portion moving toward the front of the car and the lower cam portion moving toward the rear of the car. Rotary motion of the cam member serves to separate the central web 72 of the rear shoe from the follower element 96' of the socket forming member 98.

The separating force of the cam members 64 acts first to compress the fluid within the blister 102, any excess fluid therein transferring through the line 106 to the blister in the opposite or left brake, if the left brake should lag in its action due to slackness in its cable 38 or because of wear of brake parts. If both brakes are in the same condition with respect to tautness of cables and wear of parts, a substantially equal compressive force will be applied to the blister 102 in each brake and no relative movement will result between the socket 98 and plug 100. As rotation of the cams 64 continues, the shoes will be forced further apart and the linings carried thereby will move into engagement with the brake drum 87.

If a slight inequality exists in the adjustment of the right and left brake, one set of shoes (the right brake, for example) will come into contact with their brake drum prior to contact of the other set (the left brake) with their drum. This initial contact of the shoes with the drum will serve to increase the resistance to movement of the shoe to which the blister 102 is operatively connected and will cause an increased compressive force to be exerted on the blister. This increase of pressure will transfer through line 106 and will manifest itself in an expansion of the blister located within the left brake to move the shoes connected therewith into engagement with the drum until pressures are again equalized between the brakes as by contact of the left brake shoes with their drum. The system thus provides for equalization of adjustment between the brakes and this adjustment will be understood to occur very rapidly or almost instantaneously as the brakes are applied.

As braking pressure is increased, the linings of the shoes are forced more tightly into contact with the drums and the frictional drag between these surfaces tends to carry the shoes along with the drum. Since the brakes have been initially placed in a condition of equal adjustment by the equalizer, the frictional drag by the drum on the shoes is in direct proportion to the coefficient of friction existing between the drum and the shoe linings. If the linings are glazed, or if a liquid such as grease is lying upon their surfaces, the drag will be smaller than if the linings are dry and unglazed. The same is true with respect to the condition of the drum, rustiness or roughness thereof increasing the drag and smoothness or cleanliness being the normal condition resulting in a lower more uniform coefficient of friction.

The force tending to rotate the shoes is transferred through the shoes 66 and the adjuster 76 to the socket plug 100 where such force is manifested by a tendency to compress the fluid within blister 102. This compressing action is due to the fact that the cam follower 96' has an anchoring action on the anchor pin 58, thus preventing transmission of the drag through the cam carrier 62 to the other shoes 66.

Although the adjusting or equalizing action is described as comprising a series of steps, it will be understood that this action takes place within a very short time interval as the brakes are being applied and it is probable that several of the adjustments take place simultaneously.

It will also be understood that this type of equalizer is effective to adjust the brakes during application of the brakes so as to take care of differences which may arise during prolonged use of the brakes. This results in constant adjustment of the brakes during use to provide effective equalization at all times when the brakes are in use. The relatively small fluid conduit extending between the blisters offers little or no frictional resistance to the transmission of fluid pressures therealong as only minute quantities of fluid are required to flow through only a small portion of the conduit to displace fluid from one blister to the other.

The foregoing discussion applies in instances where the vehicle is moving in a forward direction upon application of the brakes so as to cause the wheel and the brake drum 87 to rotate in the direction of the arrow A of Figure 3. When the vehicle is moving rearwardly or in reverse, the motion of the drum 87 will be in a counter clockwise direction or reverse to the direction of rotation as shown by the arrow A, and the brake shoes 66 will tend to rotate in the same direction by reason of the drag existing between the drum and the shoes. This drag will be transmitted through the linings 85 to the shoes 66, through the adjusting mechanism 76 and the spreader cams 64 to the follower mechanism 96' which will transmit force of such drag to the socket member 98 for the purpose of compressing the fluid within the blister 102. Again any inequalities of pressure existing between the two blisters 102 will cause a flow of fluid or a transference of pressure from the high to the low pressure for the purpose of equalizing the two pressures. The adjustments which have been described hereinbefore will take place similarly in reverse. It should be noted, however, that the equalizing action will not be as perfect in reverse as in forward motion as the cam member 62 tends to seat with its slot 60 upon anchor pin 58 and equalization is not effected when this occurs. This situation is not serious as it is never necessary to stop from high speeds in reverse and the ordinary equalization will suffice.

Figure 6:
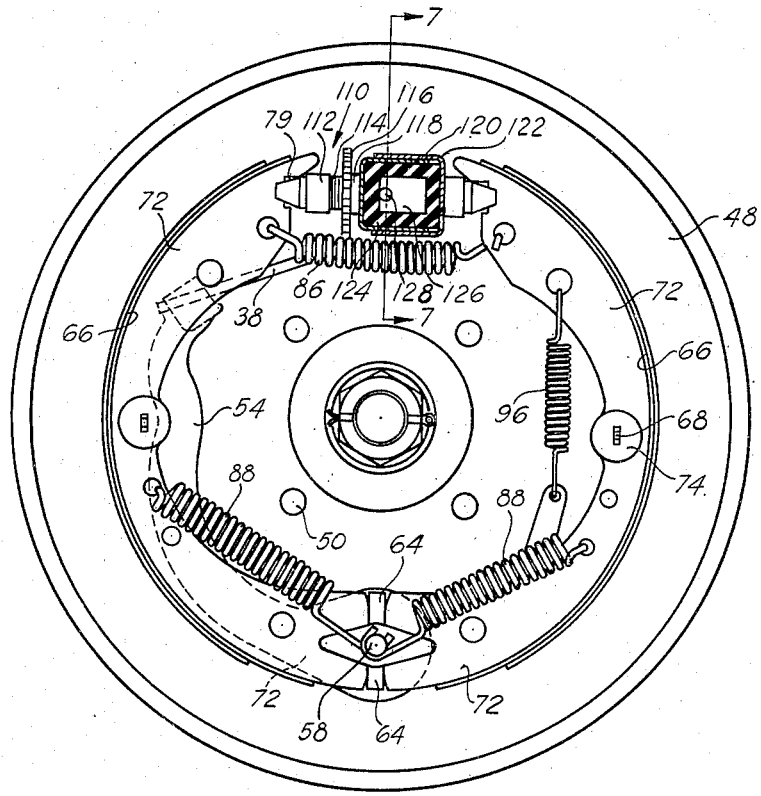
Figure 6 is an elevational view of a modified form of the invention, similar to Figure 3; and, Figure 7 is a rear elevational view, partially in section, of a rear axle showing the modified form of the invention disclosed in Figure 6.
Figure 7:
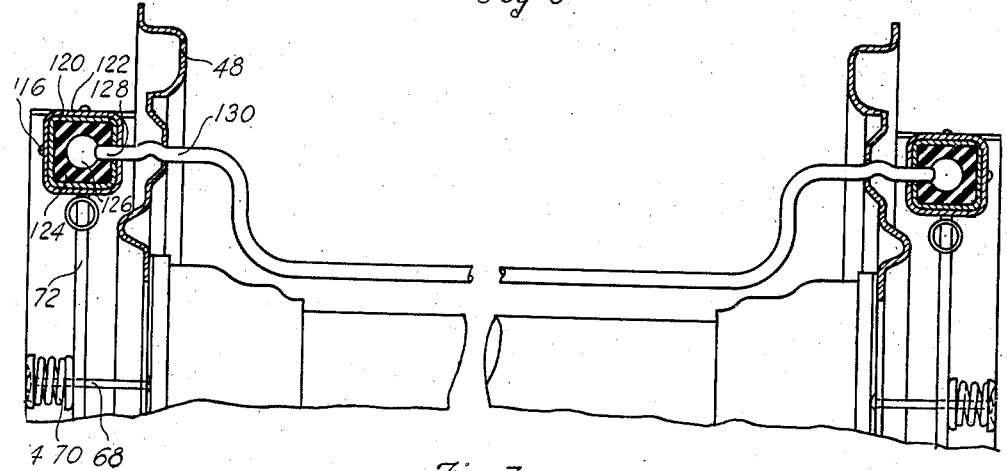

Referring to the modified form of construction shown in Figures 6 and 7, the brake operating elements are identical with those shown in Figures 1 to 5 except that the shoes 66 are both complete and whole, and no socket or blister is introduced in the forward shoe 66; instead the hydraulic equalizer blister is located in a portion of the brake shoe adjusting mechanism.

The upper ends of the central web 72 of the shoes 66 terminate in notched portions 79 in which there is received the bifurcated end of each half of the adjusting mechanism 110. Left hand portion 112 of the adjusting mechanism comprises a socket which is internally threaded to receive an externally threaded adjusting socket 114 fast with the star wheel 116. Star wheel 116 is rotatably mounted upon a bearing (not shown) fast to a part 118 which has its opposite end welded or otherwise suitably secured to an internal socket member 120, square in cross-section. An external socket member 122 also square in cross-section is adapted to mate with and telescope the internal socket member 120 to provide a space therewithin in which there is received a hollow collapsible bag or blister 124 of a shape to fill such space.

Blister 124 may be of rubber or any other suitable flexible material and is provided with a central hollow portion 126 and an outlet 128 to which a conduit 130 of flexible material is suitably permanently secured. Conduit 130 corresponds to the conduit 106 of Figures 1 to 5 and operates to connect the blister 124 in the right brake to a similar blister located in a similar position within the adjusting mechanism in the left brake.

In operation this modified form of the device functions in a fashion very nearly identical with the functioning of the modification shown in Figures 1 through 5, the drag existing between the brake drum and the brake lining manifesting itself in a tendency of the shoes 66 to move in a clockwise direction, as viewed in Figure 6. This entire force caused by the drag must be transmitted, if at all, through the adjuster 110 and will result in a compression of the fluid lying within the blister 124, the socket members 120 and 122 merely telescoping one another and operating to reduce the size of the socket and to compress the blister therein as they tend to close. Any inequality in pressure which exists between the right and left brake blisters will be equalized by reason of their hydraulic connection through the line 130, fluid flowing from the point of higher compression to the point of lower compression and expanding the blister which is the least compressed and acting to force the brake shoes apart to increase the braking effect upon the drums. All statements made with respect to the modification of Figures 1 through 5 apply with respect to the present modification with the exception that the forward shoe 66 does not enter very greatly into the equalizing effect since it may anchor against the anchor pin 58 in opposition to the drag of the drum thereupon, and its drag will not appear in the compression of the fluid within the blister 124. A similar situation prevails in bringing the vehicle to a halt from a rearward movement, but in such an instance the rear shoe 66 will have no effect upon the compression of the fluid due to its tendency to anchor ultimately upon the pin 58, the forward shoe in such rearward motion serving to equalize the brakes. This modified form of the invention is advantageous in that it may be applied to automotive vehicles which are at present supplied with mechanical brakes and brake adjusters of the star wheel type, simply by substituting adjusters such as here disclosed in place of the standard star wheel type of adjuster which is in the brake. The installation of such an equalizer is a relatively simple matter and could be accomplished by any mechanic within an hour.

It will thus be recognized that a device has been provided which overcomes all of the disadvantages inherent in hydraulic brakes and provides the safety of mechanical brakes.

While the invention has been described in considerable detail the description is not to be considered as limiting but merely as exemplifying the best mode of practicing the invention. All equivalents falling within the scope of the attached claims are reserved.

I claim:

1. The combination with a plurality of brakes having rotatable drums, a plurality of brake shoes associated with each of said drums, and means for moving said brake shoes into engagement with said drums, said shoes being mounted for limited universal movement in the plane of said drums with respect to said drums and said moving means, of fluid pressure operated means mounted in the path of floating movement of said shoes and adapted to be actuated by movement of said shoes to actuate the shoes of the other brakes so that the resulting braking effect of all the brakes will be equalized.

2. A pair of brakes each comprising a rotatable brake drum, a plurality of brake shoes mounted within said drum for limited universal movement in the plane of said drum, means for expanding said shoes into contact with said drum, said mounting permitting said shoes to partake of the rotation of said drum, a fluid containing element mounted in the path of floating movement of said shoes, and means interconnecting the fluid in the elements for transferring excessive pressure from one element to the other, said pressure being created by the movement of said shoes.

3. A brake for use with similar brakes upon a vehicle comprising a rotatable drum, arcuate shoes arranged within the drum for expansion into braking engagement with said drum, said shoes being mounted in such a manner as to have limited movement under the influence of said drum rotation, an expansible socket within one of said shoes, a compressible fluid-tight bag within said socket, and a fluid line connecting said bag with a similarly located bag in other brakes of said vehicle.

4. A braking system for automotive vehicles of the type in which a series of brakes are interconnected by hydraulic equalizing means, each brake comprising a drum for rotation with a wheel, a set of arcuate shoes arranged within said drum and adapted to be expanded into braking engagement with said drum, a socket formed in one of said shoes and having a telescoping member engaged therewith, and a collapsible blister within said socket and adapted to be collapsed to intensify the pressure therein, the blisters being connected to one another to permit equalization of pressure therebetween.

5. A braking system comprising a series of wheel brakes, each of said brakes including a drum rotatable with a wheel, friction braking elements forming a closed path and mounted for universal movement within said brake drum, and each mounted for servo-application to said drum, hydraulic means between two of said friction elements and lying in said path and adapted to be actuated at least in part by the servo-application of said friction elements to the drum, and a fluid line connecting said hydraulic means in at least two of said brakes.

6. A braking system comprising a series of wheel brakes, each of said brakes including a drum rotatable with a wheel, brake shoes arcuately arranged within said drum and each floatingly mounted for limited universal motion in the plane of said drum and limited rotation with said drum, means directly connecting the ends of said shoes together and partaking of the limited rotation of the shoes to the full extent of such rotation, and hydraulic means within said connecting means and hydraulically connected between two of said brakes.

7. A braking system comprising a series of wheel brakes, each of said brakes including a drum rotatable with a wheel, a set of friction elements mounted for limited universal movement in the plane of said drum and within said drum and having their ends connected together to form an arcuate braking surface for engagement with the drum, means for expanding said series of friction elements into contact with said drum while permitting said elements limitedly to rotate with the drum, means forming a part of the connections between said braking elements and responsive to the force expanding said elements for ensuring the application of an equal expansive force to another of said brakes.

8. A braking system comprising a series of wheel brakes, each of said brakes including a drum rotatable with a wheel, a set of friction elements mounted for limited universal movement in the plane of said drum and within said drum and having their ends connected together to form an arcuate braking surface for engagement with the drum, floating means for expanding said series of friction elements into contact with said drum while permitting said elements limitedly to rotate with the drum, means forming a part of the connections between said braking elements and responsive to the force expanding said elements for ensuring the application of an equal expansive force to another of said brakes, said force responsive means comprising a collapsible fluid filled member connected to a similar member in the other brake by a fluid line.

9. A braking system comprising a series of brakes, each of said brakes comprising a rotatable drum, a series of friction elements mounted for limited universal movement in the plane of said drum and within and adjacent to said drum to form a closed circle of mechanism so mounted that all parts thereof may partake of limited motion in the direction of rotation of said drum when in contact therewith, means for expanding said mechanism to force said friction elements into contact with said drum, an arcuate collapsible chamber within said mechanism, and means connecting said chambers in the system for equalizing the pressures existing therein.

10. A braking system comprising a series of brakes, each of said brakes comprising a rotatable drum, a series of friction elements mounted for limited universal movement in the plane of said drum and within and adjacent to said drum to form a closed circle of mechanism so mounted that all parts thereof may partake of limited motion in the direction of rotation of said drum, means for expanding said mechanism to force said friction elements into contact with said drum, an arcuate collapsible chamber within said mechanism, and means connecting said chambers in the system for equalizing the pressures existing therein, said chamber comprising telescoping members.

11. A braking system comprising a series of brakes, each of said brakes including a rotatable drum, a series of friction elements arranged within and adjacent to said drum to form a closed circle of mechanism said mechanism being mounted for limited universal movement in the plane of said drum, means for expanding said mechanism to force said friction elements into contact with said drum, hydraulic means forming a part of said closed circle of mechanism to register the force tending to carry said elements along with said drum, and means connecting all of said hydraulic means in the system to equalize the pressures existing therein.

12. A braking system comprising a series of brakes, each of said brakes including a rotatable drum, a series of friction elements arranged within and adjacent to said drum to form a closed circle of mechanism, means mounting said entire mechanism to permit it limited universal movement in the plane of said drum along said closed circle, means for expanding said mechanism to force said friction elements into contact with said drum, hydraulic means forming a part of said circle of mechanism and connected to the other hydraulic means in the system and being acted upon both by the force expanding the friction elements into contact with the drum and by the force tending to rotate said elements with the drum first to equalize the adjustment of the friction elements with respect to the drum and then to equalize the braking effect of the friction elements upon the drum in all of the brakes in the system.

13. A brake comprising a rotatable drum, a pair of brake shoes mounted for limited universal movement in the plane of said drum within said drum and having arcuate surfaces faced with friction material for engagement with said drum, full floating means connecting adjacent ends of said shoes for adjusting the same toward and away from said drum, said adjusting means including hydraulic means for registering the braking effect of the friction surfaces upon the drum, and other means for spreading said shoes to apply the friction surfaces to said drum, said hydraulic means being connected with a similar hydraulic means in another brake.

14. A brake comprising a rotatable drum, a pair of brake shoes arranged within said drum and having arcuate surfaces faced with friction material for engagement with said drum, said shoes being mounted for limited universal movement in the plane of said drum, means extending between adjacent ends of said shoes spacing them apart and movable to move said shoes toward and away from said drum, said means including hydraulic means tangentially located between said shoes for registering the braking effect of the friction surfaces upon the drum and other means for spreading said shoes to apply said friction surfaces to said drum, said hydraulic means being connected with a similar hydraulic means in another brake.

15. A brake comprising a rotatable drum, a pair of brake shoes within said drum and having arcuate surfaces faced with friction material for engagement with said drum, said shoes being mounted for limited universal movement in the plane of said drum, adjusting means extending between and spacing two of the ends of said shoes to adjust the shoes toward and away from the drum, and mechanically movable means extending between and operatively connected with the other two ends of said shoes and movable to expand or contract said shoes, and one of said adjusting or movable means including hydraulic means for registering the braking effect of the friction surfaces upon the drum and being connected with a similar hydraulic means in another brake.

16. A brake comprising a rotatable drum, a plurality of arcuately arranged brake shoes within said drum having arcuate friction surfaces for engagement with said drum, said shoes being arranged for limited universal movement in the plane of said drum, means connecting adjacent ends of said shoes, at least one of which is mechanically movable to expand said friction surfaces into contact with said drum, and hydraulic means forming one abutment of said brake expanding means and movable thereby to register the braking effect of the friction surfaces upon the drum.

17. A brake comprising a plurality of brake shoes, a brake drum, means connecting said shoes together, said brake shoes and connecting means being mounted for limited universal movement in the plane of said drum, means for spreading the shoes apart to apply the brake shoes to the drum, and hydraulic means located adjacent one end of one of said shoes and subject to the spreading effort of said means serving as an additional shoe spreading means, said shoes being so mounted that the frictional drag between drum and shoes serves at least in part to actuate said hydraulic means.

18. A brake comprising a rotatable drum, a plurality of brake shoes arranged within said drum and connected together to have a normal braking circumference slightly less than the braking circumference of said drum, said shoes being mounted for limited universal movement in the plane of said drum, mechanical means to expand said shoe braking circumference to engage it with the drum braking circumference and then to increase the braking pressure between the two, and hydraulic means located in the train of brake shoes and adapted to exert still further braking pressure to increase the braking effect while said mechanical means is still functioning, said shoes being so mounted that the frictional drag between drum and shoes serves at least in part to actuate said hydraulic means.

19. A brake comprising a rotatable drum, a plurality of brake shoes arranged within the drum, and having arcuate friction surfaces for engagement therewith, said shoes forming a ring, mechanical means for expanding said ring to move said friction surfaces into engagement with said drum and apply braking pressure thereto, said shoes and said mechanical means being mounted for limited universal movement in the plane of said drum, and hydraulic means located tangentially between said mechanical means and one of said shoes for applying additional braking pressure, said shoes being so mounted that the frictional drag between drum and shoes serves at least in part to actuate said hydraulic means.

20. The combination with a plurality of brakes having rotatable drums, and braking elements mounted for limited universal movement in the plane of said drums and engageable with the inner surface of said drums, of means for moving said elements into braking engagement with said inner drum surface, said elements being mounted for limited rotation with said drums in the direction of drum rotation when in engagement therewith, of fluid pressure operated means located in the path of rotation of said elements and adapted to be actuated by the drag between said elements and said drum in one brake to actuate the elements of the other brakes in the system so that the resulting braking effect of all brakes will be equalized.

NILS ERIK WAHLBERG.